No. 629,758. Patented Aug. 1, 1899.
J. ABELL.
THRESHING MACHINE.
(Application filed Nov. 28, 1898.)
(No Model.) 2 Sheets—Sheet 1.
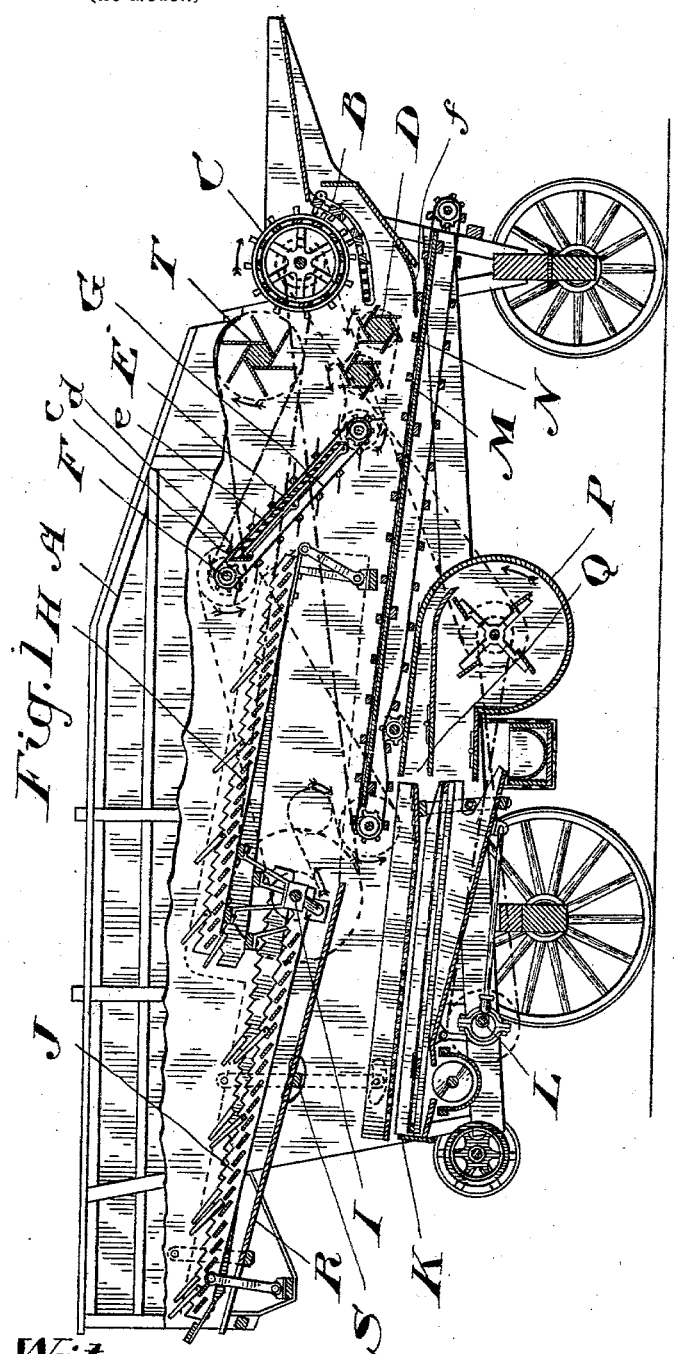
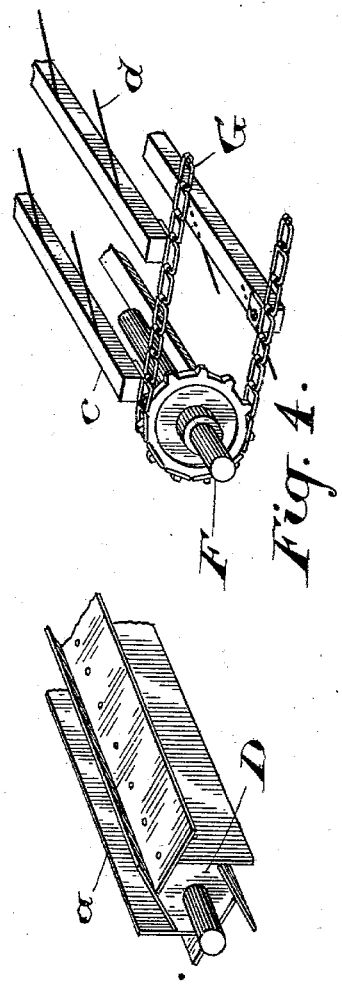
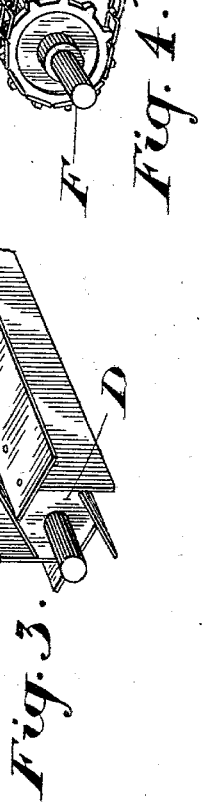
Witnesses
W. J. McMillan
A. J. Colbourne
Inventor
John Abell
by
Ridout & Maybee
atty's
THE NORRIS PETERS CO., PHOTO-LITHO., WASHINGTON, D. C.

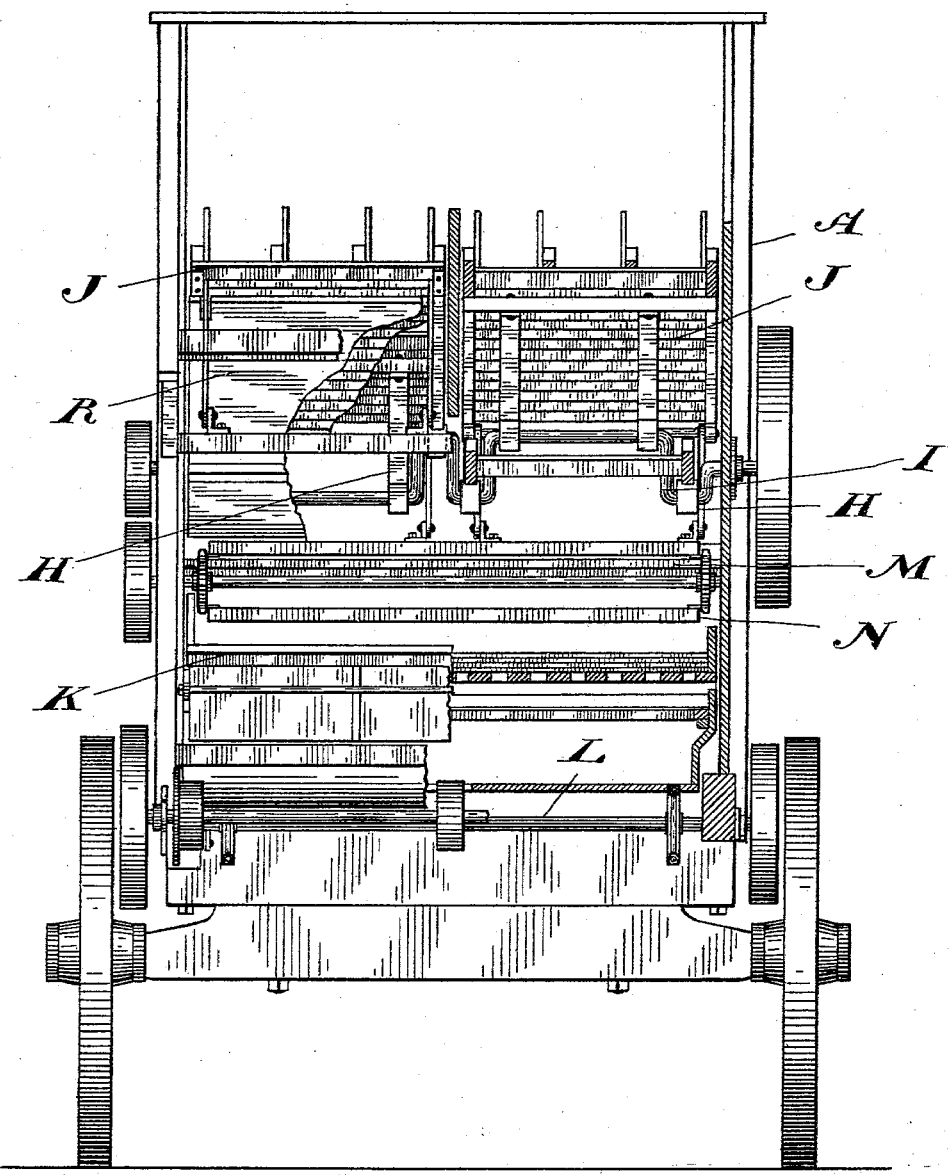

United States Patent Office.

JOHN ABELL, OF TORONTO, CANADA.

THRESHING-MACHINE.

SPECIFICATION forming part of Letters Patent No. 629,758, dated August 1, 1899.

Application filed November 28, 1898. Serial No. 697,678. (No model.)

*To all whom it may concern:*

Be it known that I, JOHN ABELL, manufacturer, of the city of Toronto, in the county of York and Province of Ontario, Canada, have invented certain new and useful Improvements in Threshing-Machines, of which the following is a specification.

The object of my invention is to devise a threshing-machine in which the larger part of the grain will be separated from the straw immediately after the latter leaves the concave and before it reaches the straw-decks, in which the vibrating parts are reduced to a minimum, and in which all liability of straw coming out over the top of the cylinder is obviated; and it consists, essentially, of the construction hereinafter more specifically described and then definitely claimed.

Figure 1 is a longitudinal vertical section of my improved threshing-machine. Fig. 2 is a rear elevation of the same, partly in section. Fig. 3 is a perspective view of a portion of one of the grain-arresters. Fig. 4 is a perspective view of a portion of one of the carriers.

In the drawings like letters of reference indicate corresponding parts in the different figures.

A is the frame of the machine, suitably constructed in proportion to support the different parts.

B is the concave, and C the cylinder, suitably journaled in proximity thereto. In proximity to the lower edge of the concave are journaled one or more grain-arresters D, constructed substantially as shown in Fig. 3. Each grain-arrester consists, substantially, of a roller of polygonal form, to the sides of which are connected the metal flanges a, which preferably point in an opposite direction to that of the rotary motion of the roller. Of course other shapes of roller and other forms of flanges might be employed with advantage. These grain-arresters run in the opposite direction to the cylinder and are so arranged as to discharge the straw thrown upon them from the concave onto the grate E. At the same time by their beating action upon the under side of the straw they shake out a very large proportion of the grain contained therein, the flanges forming pockets, into which the grain may drop to be afterward discharged below the arresters.

The grate E is formed of a series of crossbars e. At the upper end of the grate is located a shaft F, carrying a pair of sprocket-wheels, upon which run the chains G, carrying the slats c. These chains run upon suitable sprocket-wheels at the lower portion of the grate. The slats c are preferably provided with fingers d, arranged as shown in Figs. 1 and 4. The chain, slats, and fingers thus form a carrier which moves the straw up the grate, at the same time permitting a considerable portion of the grain remaining therein to fall through the bars of the grate.

From the grate E the straw is discharged upon the straw-decks H, which are of the usual open slatted construction. As the methods of supporting and driving such decks are old and well known, I will not specifically describe them, it being sufficient to state that they are supported on suitable hangers and driven from a crank-shaft I. This crank-shaft also serves to drive the straw-decks J, onto which the straw-decks H are arranged to discharge.

It will be noticed that the crank-shaft I is arranged to oppositely vibrate the straw-decks of each pair.

K is a shoe of ordinary construction, suitably supported and driven from the eccentric shaft L. With the means of discharge therefrom and with the means for removing unthreshed material and conveying it again to the cylinder this present invention has nothing to do, and description thereof is unnecessary.

Extending from a point below the concave to a point above the forward end of the shoe is an upwardly-inclined board M, upon which travels a chain conveyer N similar to that provided for the grate E. This conveyer is carried by suitable sprocket-wheels and driven from the shaft O. All grain and material dropped through from the grain-arresters, the grate, or the straw-decks H are caught by the board M and deposited by the chain conveyer N upon the shoe, there to be properly separated.

In order to prevent the chain conveyer carrying material down underneath the board M, I provide the fan P with an independent outlet Q, by means of which an air-blast is directed under the rear end of the said board, which effectually accomplishes the object aimed at.

In order to catch grain falling through the straw-decks J and convey it to the forward end of the shoe, I support a board R beneath them, which board is supported on suitable hangers and driven by being connected to the hanger S, supporting the shoe K.

A canvas strip $f$ is preferably attached to the front of the frame of the machine and rests upon the board M and conveyer N, so as to prevent any escape of grain at the lower end of the board. Above the grain-arresters D is suitably journaled the straw-arrester T, of similar construction to the grain-arresters, but adapted to revolve in the opposite direction. This straw-arrester stops and throws back into the machine all straw which has a tendency to be thrown out of the machine above the cylinder. I find that by the use of the grain-arresters D a large proportion of the grain is shaken out of the straw before the latter reaches the grate E and that by the time the straw reaches the straw-decks H and J a comparatively small part of the separation falls to their share. By the use of the inclined grate E, with its traveling conveyers, I avoid all possibility of bunches of grain filled with straw being thrown up to the straw-decks, as formerly happened when reciprocating forks were used for a similar purpose. With so much of the separation taking place immediately after the grain leaves the concave I am enabled to dispense with a grain-deck extending from end to end of the machine, making a great improvement in the running and balance of the machine, the board M taking the place of the forward end of the grain-deck and conveying the grain rearwardly to the point of ultimate separation and cleaning.

What I claim as my invention is—

1. In a threshing-machine, a cylinder and a concave, in combination with one or more flanged rollers or grain-arresters journaled in proximity to the lower end of said concave, an inclined grate over which the straw is thrown, carriers moving around said grate and supported on suitably-driven endless chains to move the straw up the grate, whereby the straw is lightly carried up the grate above both the grate and carrier, one of the aforesaid grain-arresters being at or below the bottom of the said cylinder and the other above it, and above or on a level with the lower portion of the said traveling carriers, both arresters being substantially set out from under the cylinder, substantially as and for the purpose specified.

2. In a threshing-machine a cylinder and concave, in combination with one or more flanged rollers or grain-arresters journaled in proximity to the lower end of the concave; an inclined grate onto which the straw is thrown; carriers supported on suitably-driven endless chains to move the straw up the grate; a vibrating shoe; an upwardly-inclined board extending from a point below the concave to a point above the shoe; carriers supported on suitably-driven endless chains to move grain falling upon the board onto the shoe; and two oppositely-vibrating straw-decks arranged side by side onto which the straw from the grate is discharged, substantially as and for the purpose specified.

3. In a threshing-machine a cylinder and concave, in combination with one or more flanged rollers or grain-arresters journaled in proximity to the lower end of the concave; an inclined grate onto which the straw is thrown; carriers supported on suitably-driven endless chains to move the straw up the grate; a vibrating shoe; an upwardly-inclined board extending from a point below the concave to a point above the shoe; carriers supported on suitably-driven endless chains to move grain falling upon the board onto the shoe; two oppositely-vibrating straw-decks arranged side by side onto which the straw from the grate is discharged; and two oppositely-vibrating straw-decks arranged side by side onto which the straw from the aforesaid decks is discharged, substantially as and for the purpose specified.

4. In a threshing-machine a cylinder and concave, in combination with one or more flanged rollers or grain-arresters journaled in proximity to the lower end of the concave; an inclined grate onto which the straw is thrown; carriers supported on suitably-driven endless chains to move the straw up the grate; a vibrating shoe; an upwardly-inclined board extending from a point below the concave to a point above the shoe; carriers supported on suitably-driven endless chains to move grain falling upon the board onto the shoe; two oppositely-vibrating straw-decks arranged side by side onto which the straw from the grate is discharged; two oppositely-vibrating straw-decks arranged side by side onto which the straw from the aforesaid decks is discharged, and a vibrating board located below the rearmost decks, and arranged to discharge onto the forward end of the shoe, substantially as and for the purpose specified.

Toronto, Canada, November 19, 1898.

JOHN ABELL.

In presence of—
 J. EDW. MAYBEE,
 N. C. DICKSON.